March 7, 1967  R. W. BISER  3,308,410
ROTARY ACTUATOR HAVING ASSOCIATED CLUTCH MEANS
Filed Jan. 30, 1961  3 Sheets-Sheet 1

INVENTOR.
ROGER W. BISER
BY
HIS ATTORNEYS

March 7, 1967  R. W. BISER  3,308,410
ROTARY ACTUATOR HAVING ASSOCIATED CLUTCH MEANS
Filed Jan. 30, 1961  3 Sheets-Sheet 2

INVENTOR.
ROGER W. BISER
BY
His Attorney

March 7, 1967 R. W. BISER 3,308,410
ROTARY ACTUATOR HAVING ASSOCIATED CLUTCH MEANS
Filed Jan. 30, 1961 3 Sheets-Sheet 3
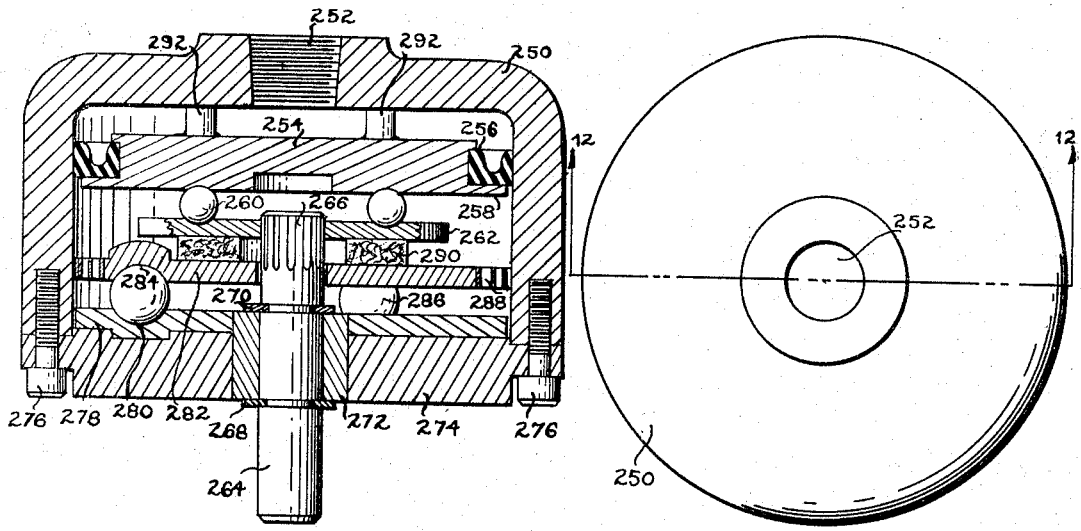
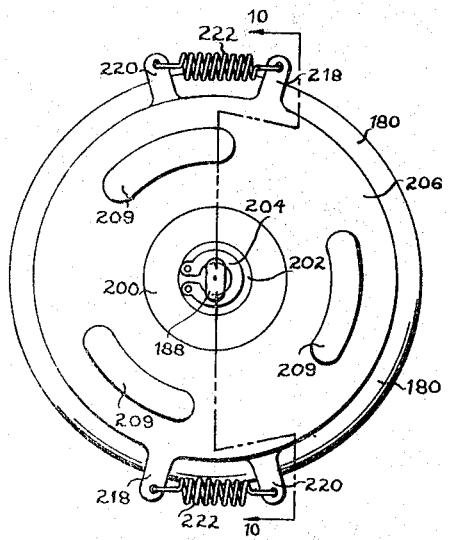
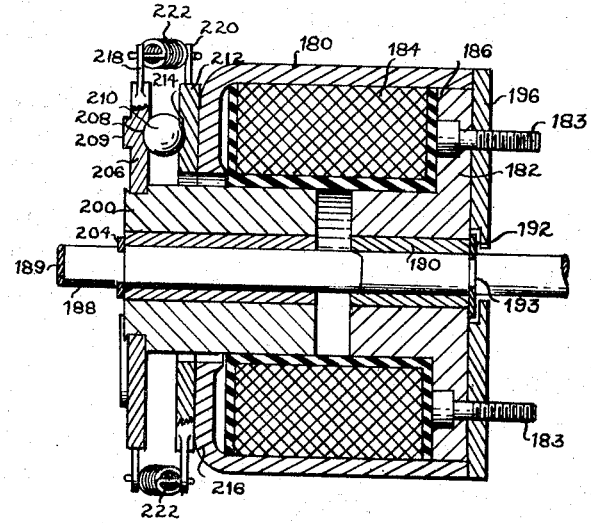
INVENTOR.
ROGER W. BISER
BY
HIS ATTORNEYS

United States Patent Office 3,308,410
Patented Mar. 7, 1967

1

3,308,410
ROTARY ACTUATOR HAVING ASSOCIATED CLUTCH MEANS
Roger W. Biser, Troy, Ohio, assignor to Ledex, Inc., Dayton, Ohio, a corporation of Ohio
Filed Jan. 30, 1961, Ser. No. 85,926
23 Claims. (Cl. 335—228)

The present application is a continuation-in-part of my copending application, Serial No. 606,711, filed August 28, 1956, now abandoned, for a Rotary Solenoid.

This invention relates to rotary actuators adapted to convert an axial thrust to rotary movement and more particularly to an improved motion conversion mechanism including a clutch enabling manually induced rotary movement independent of the axial thrust; however, the invention is not necessarily so limited.

The mechanism of the present invention is applicable to various types of actuator devices including hydraulic, pneumatic, and electromagnetic actuators. Specifically, the present invention is an improvement on a basic mechanism for converting axial movement to rotary movement, the basic mechanism being well known in the rotary solenoid art. This basic mechanism is shown and described in association with an electromagnetic actuator in United States Letters Patent No. 2,496,880, issued to George H. Leland, granted February 7, 1950.

An object of the present invention is to provide an improved mechanism for converting axial movement into rotary movement.

Another object of the present invention is to provide a mechanism for converting an axial thrust from an actuating unit to rotary movement of a driven element such as a shaft, the mechanism including clutch means enabling independent rotation of the output element in the absence of an axial thrust.

Another object of this invention is to provide an electromagnetic actuator unit embodying the aforesaid mechanism.

Still another object of the present invention is to provide a hydraulic or pneumatic actuator unit embodying the aforesaid mechanism.

A further object of the present invention is to provide a rotary solenoid for operating a shaft through a clutch mechanism, such that the shaft can be freely rotated in either direction as long as the solenoid is not energized, but will be driven the full rotation allowed by the solenoid stroke when the solenoid is energized.

Still a further object of this invention is to provide a rotary solenoid of the aforesaid type wherein the shaft is rotatably driven, but not necessarily axially driven, enabling direct utilization of the shaft for operation of one or more wafer switches or the like without any intermediate linkage as has been required in earlier devices.

Still a further object of this invention is to provide a rotary solenoid having a magnetically operated clutch intermediate the axially driven input element and the rotated output element.

Still a further object of this invention is to provide a rotary solenoid assembly which may be employed to actuate a freely rotatable shaft selectively in either a clockwise or counterclockwise direction.

Other objects and advantages reside in the construction of parts, the combination thereof, the method of manufacture and the mode of operation, as will become more apparent from the following description.

In the drawings,

FIGURE 9 is an end elevational view of a fourth modification.

FIGURE 10 is a sectional view taken substantially along the line 10—10 of FIGURE 9.

FIGURE 11 is an end elevational view of a hydraulic actuator embodying the mechanism of the present invention.

FIGURE 12 is a sectional view taken substantially along the line 12—12 of FIGURE 11.

Figure 1:
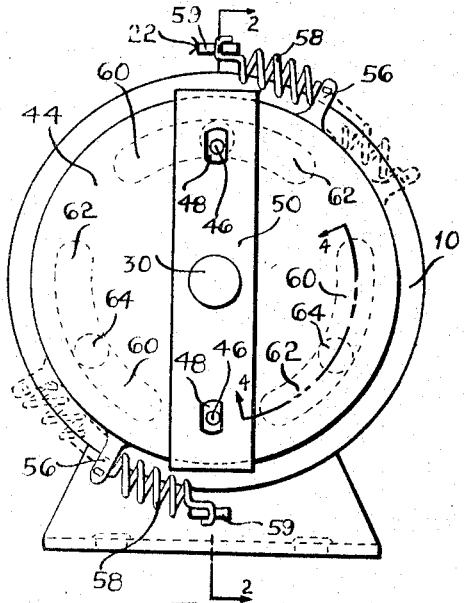
FIGURE 1 is an end elevational view of a rotary solenoid unit embodying the mechanism of the present invention.
Figure 2:
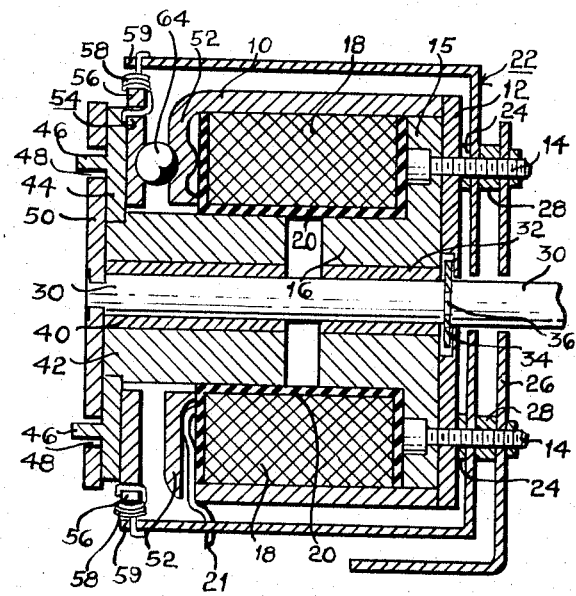
FIGURE 2 is a sectional view taken substantially along the line 2—2 of FIGURE 1.

Referring to the drawings in detail, FIGURES 1 through 10 illustrate various adaptations of the present invention to electromagnetic actuator devices, frequently referred to as rotary solenoids. Referring particularly to FIGURES 1 and 2, the rotary solenoid comprises a housing which is preferably cylindrical in form and which includes a cup-shaped casing 10 and a back wall or closure 12 for the open end of the casing. Secured to the back wall 12 by suitable screws 14 is a ferromagnetic element 15 arranged concentric with the casing 10 and having a cylindrical inwardly directed portion 16 providing a core for the solenoid. The solenoid coil 18 extends about the core 16 within the casing 10, the coil being separated from the core by a suitable insulating layer 20. The coil 18 and core 16 comprise a conventional electromagnet which may be electrically energized through the leads at 21.

A spring supporting element 22 to be described more fully later is secured to the casing by the screws 14, the element 22 being separated from the back wall 12 of the casing by suitable spacing sleeves 24. The electromagnet is supported by a suitable angular bracket 26 also secured by the screws 14 and spaced from the spring supporting element 22 by suitable spacing sleeves 28.

The bracket 26, the spring supporting element 22, and the back wall 12 of the casing are each provided with aligned apertures concentric with respect to the cup-shaped casing 10, adapted to receive a shaft 30 passing axially through the solenoid. The shaft 30 is journalled for rotation in a bearing 32 disposed centrally in the core 16. A snap ring 34 seated in an annular groove 36 in the shaft 30 and recessed into the back wall 12 of the casing restricts axial movement of the shaft 30 without limiting rotary motion thereof.

Rotatably mounted upon the shaft 30 adjacent the core 16, so as to be slidable into and out of the open end of the casing 10, is a bearing 40 supporting a cylindrical armature 42. The armature 42 has a diameter substantially equal to that of the core 16 and is movable into and out of the annular coil 18. The armature 42 is thus mounted for axial motion upon the shaft 30.

Press fitted or otherwise secured to the outer end of the armature 42 is a disc or plate 44 provided with diametrically opposed outwardly projecting spaced studs 46. As will be described subsequently, the length of the studs 46 is substantially equal to or greater than the axial stroke of the armature.

The studs 46 project into aligned apertures 48 located in a drive plate 50 rigidly secured to the shaft 30 adjacent the outer end of the armature 42. Thus, although the armature 42 is rotatably mounted upon the shaft 30, the armature 42 and shaft 30 cannot be independently rotated due to the engagement of the studs 46 with the drive plate 50. The axial motion of the armature 42 into the solenoid is in no way restricted by this arrangement, however.

It is evident that upon energization of the coil 18, the armature 42 will be drawn axially into the casing 10 by the magnetic field created. This axial motion is converted to a rotary motion to be impressed upon the shaft 30 by the following means. Integral with the cup-shaped casing 10 and forming an apertured base or end portion thereof, is an annular inwardly directed flange portion 52. The aperture within this flange portion has a diameter slightly greater than that of the armature 42, so as not to restrict the axial motion of the armature. Encircling the armature 42 and parallel to and in spaced relation to the outer surface of the flange portion 52 is an apertured disc or friction plate 54, the aperture therein being of sufficient diameter to accommodate the armature 42.

The disc 54 is provided with diametrically opposite lugs 56, each adapted to engage one end of a coil spring 58, there being two such coil springs. The opposite ends of the coil springs are serured to elongate arms 59 of the spring supporting element 22, the arms 59 extending parallel to the sides of the casing 10. The disc 54 is thus rotatably supported adjacent the flange portion 52, although biased to a fixed anghlar position by the springs 58.

Figure 4:
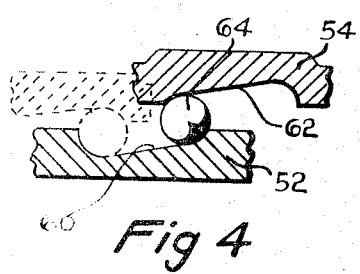
FIGURE 4 is an enlarged fragmentary sectional view taken substantially along the line 4—4 of FIGURE 1.

The opposing surfaces of the disc 54 and the flange portion 52 are each provided with three equispaced arcuate inclined recesses 60 and 62, respectively. The disc 54 is oriented initially with respect to the flange portion 52 so that the ends of the recesses 60 of the disc 54 are aligned substantially with the ends of the recesses 62 of the flange portion 52, as clearly shown in FIGURE 1. As shown in FIGURE 4, the recesses 60 and 62 are oppositely inclined.

Disposed between each pair of opposing recesses 60 and 62 is an anti-friction element shown in the drawings as a ball bearing 64. As shown in FIGURE 4, the disc 54 and flanges portion 52 are initially spaced-apart with the biasing tension of the springs 58 holding the balls 64 in the extreme shallow ends of the recesses 60 and 62. The balls 64 are prevented from dropping out of the aligned recesses 60 and 62 by the drive plate 50 which limits the spacing between the disc 54 and the flange portion 52.

In operation, electrical energization of the coil 18 creates a magnetic field drawing the armature 42 into the coil. The disc 44 carried by the armatue 42 drives the disc 54 inwardly toward the flange portion 52 of the cup-shaped casing 10. The inclined recesses 60 and 62 cooperate with the ball bearings 64, to permit axial motion of the disc 54 only if the disc 54 also rotates, allowing the ball bearing 64 to roll into the recesses 60 and 62, as shown in broken line in FIGURE 4. The result is that the axial motion of the armature 42 is converted to rotary motion of the disc 54. As shown in broken line in FIGURE 1, the rotary motion of the disc 54 elongates the springs 58, creating a restoring force, the magnitude of which is proportional to the rotary displacement of the disc 54.

The magnetic attraction of the armature 42 creates a mechanical contact force between the disc 44 carried by the armature 42 and the disc 54. Due to the friction forces created between the discs 44 and 54, the disc 54 as it rotates, forces the disc 44 and thereby the armature 42 to rotate. Through the action of the studs 46, the drive plate 50 and, as a consequence, the shaft 30, is rotated. The discs 44 and 54 thus function as a magnetically operated clutch, although in the present arrangement the force between the discs 44 and 54 may be purely mechanical.

The aforementioned friction force is increased in practice by roughening the contacting surfaces of the discs 44 and 54 or by inserting a clutch lining as will be described later. Further, if the discs 44 and 54 are both made of ferromagnetic materials, although this is not essential, the disc 44 engaging the armature 42 will acquire a strong magnetic charge, enhancing the contact force between the two discs. In this respect, the discs 44 and 54 may cooperate to provide, in fact, a magnetic clutch.

When the coil 18 is deenergized, the springs 58 restore the disc 54 to its initial angular position, resetting the rotary mechanism. Since the large contact forces between the discs 44 and 54 no longer exist, the disc 54 is free to rotate without rotating the armature, and, as a result, the drive plate 50 or shaft 30.

The disc 54, flange 52, balls 64 and spring 58 thus constitute a pressure actuated, self-returning means which produces an angular displacement transmitted to shaft 30 each time the coil 18 is energized, the displacement being clockwise, as viewed in FIGURE 1, for the particular arrangement described. The direction of rotation may be reversed by inverting the inclination of the recesses 60 and 62. It is to be noted that the shaft 30 is rotated by the rotary solenoid but not driven axially.

The amount of angular displacement of the shaft 30 is determined initially by the arc length of the recesses 60 and 62, it being understood that the slope of the inclined recesses 60 and 62 can be adjusted according to the available axial displacement of the armature 42. The exact angular displacement of the shaft 30 may be regulated ultimately by a suitable detent structure associated with the shaft 30, as would be the case if the rotary solenoid is utilized to actuate a conventional wafer switch. In connection with such applications, the present device offers the advantage that the shaft 30 may be rotated manually and independently of the solenoid when the solenoid is deenergized. This then permits both manual and automatic selection of the angular position of the shaft 30.

It has been noted that the springs 58, as shown in FIGURE 1, produce a restoring force which increases as the disc 54 rotates. In some applications, this feature is objectionable. The modification of FIGURES 3 and 5 embodies a return spring so arranged as to have a substantially constant return torque irrespective of the displacement of the spring, within practical limits. The modification of FIGURE 3 further illustrates a somewhat more compact arrangement of operative elements.

Figure 3:
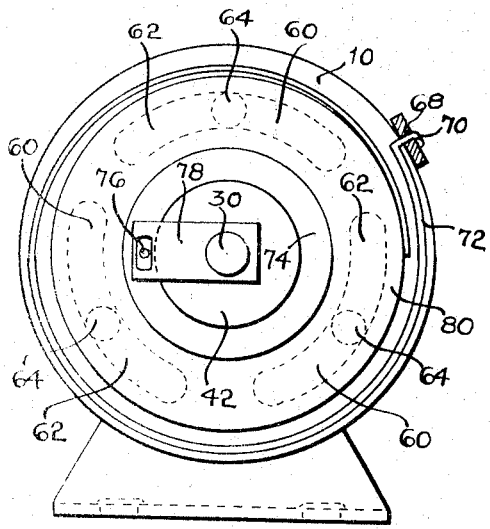
FIGURE 3 is an end elevational view of a first modification.
Figure 5:
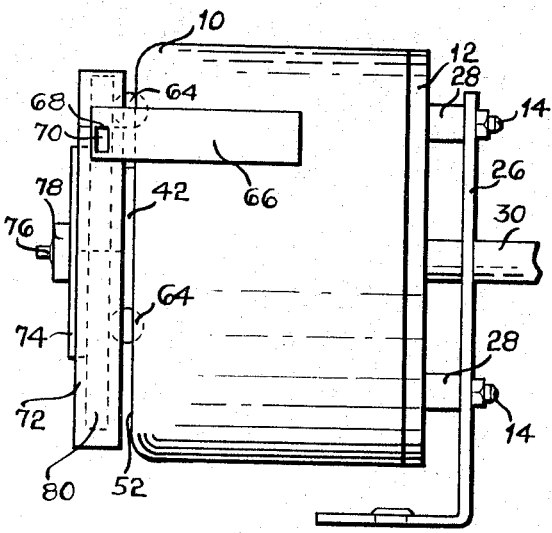
FIGURE 5 is a side elevational view of the modification of FIGURE 3.

In the modification of FIGURES 3 and 5, the housing including the cup-shaped casing 10 and back wall 12 is unchanged. Replacing the spring supporting element 22 is an ear or lug 66 welded or otherwise secured to the casing 10 and projecting beyond the end portion thereof. The ear 66 is provided with an aperture 68 adapted to receive the tongue 70 of a spiral spring 72, arranged as will be described more fully in the following, parallel to the flange portion 52 of the cup-shaped casing 10.

The modification is provided with a substantially cylindrical armature 42 as described hereinbefore. However, the annular disc 44 of the preferred embodiment has been reduced substantially in diameter in the modification as illustrated at 74 in FIGURE 3. The disc 74 is press fitted or otherwise secured to the armature 42 and provided with a single stud 76 adjacent the periphery thereof, adapted to engage a modified drive plate or arm 78 rigidly mounted upon the shaft 30. The operation of the disc 74 in rotating the shaft 30 is substantially as described hereinbefore.

An annular disc 80 is rotatably mounted upon the armature 42 in the modification in spaced relation to the casing 10. The disc 80 is provided with arcuate inclined recesses 62 coacting with complementary recesses 60 associated with the annular flange 52 of the cup-shaped casing 10. The disc 80 and flange 52 operate as a motion conversion mechanism in a manner analogous to that of the disc 54 and flange 52 in the preferred embodiment. The inner end of the spiral return spring 72 is welded or otherwise secured to the perimeter of the disc 80, so that the return spring 72 always biases the disc 80 to an operative position.

The operation of the modification is identical to that of the preferred embodiment, with friction and/or magnetic forces combining to hold the clutch discs 80 and 74 in intimate contact while the solenoid is energized.

Although not illustrated, the tension of the spring 72 may be readily adjusted by providing means for angularly adjusting the ear 66 relative to the casing 10 or for angularly adjusting the point of attachment of the inner end of the spring 72 with the disc 80.

As a further modification of the present device, the shaft 30 may project outwardly from the drive plate 50 or 78, as the case may be, the opposite end of the shaft 30 being mounted for rotation in the core 16 of the electromagnet. The shaft 30 may operate a switch or the like from either end of the rotary solenoid unit.

In the construction of the rotary solenoid herein described, the armature 42 and core 16 are preferably made from soft iron or another ferromagnetic material having low magnetic retentivity. The casing 10 is also preferably of ferromagnetic material such that the casing together with the armature and the core form a substantially continuous flux path surrounding the coil 18. The disc 54 or 80 and the disc 44 or 74 may be constructed from ferromagnetic materials, preferably also of low magnetic retentivity, although as mentioned hereinbefore, the magnetic properties of these parts are not critical. Non-magnetic materials, such as aluminum or copper, may be used for the remaining elements, although the operation of this device is not impaired by the use of ferromagnetic materials throughout.

The operative elements of the rotary conversion mechanism, namely the disc 80 or 54 and the casing 10 are preferably stamped to provide the recesses 60 and 62 although other means may obviously be employed to obtain the same result.

Figure 6:
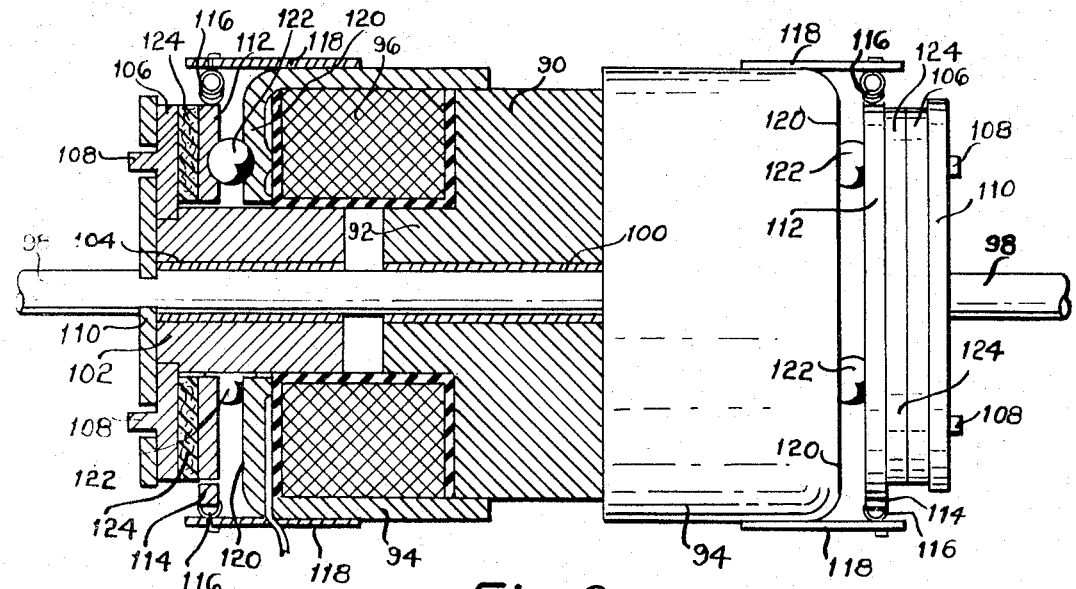
FIGURE 6 is a side elevational view with portions in section illustrating a second modification wherein two rotary solenoid assemblies are employed.
Figure 7:
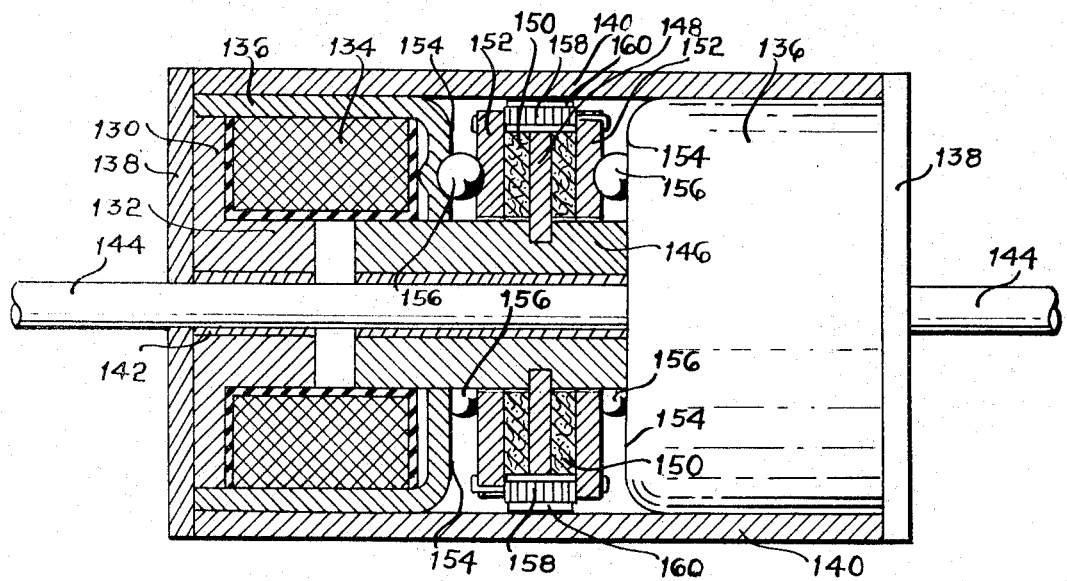
FIGURE 7 is a side elevational view with portions in section illustrating a third modification wherein two rotary solenoid assemblies are employed.

Frequently, it is desired that the shaft operated by the rotary solenoid be operable in either the clockwise or the counterclockwise direction. This result may be readily accomplished by providing two independently operable rotary solenoids driving the same shaft, one constructed to impart a clockwise rotation to the shaft and the other constructed to impart a counterclockwise rotation to the shaft. FIGURES 6 and 7 show assemblies constructed to accomplish this purpose.

The modification of FIGURE 6 illustrates a common core arrangement wherein two solenoids are joined in opposition about a cylindrical ferromagnetic core element 90 having cylindrical projections at each end thereof providing core pieces 92. As described hereinbefore a coil 96 surrounds each core piece 92, and a cup-shaped structure 94 encloses each coil 96. A shaft 98 is journalled for rotation within a bushing 100 disposed axially in the element 90. Although not shown, suitable means may be employed for restraining axial movement of the shaft 98 relative to the core element 90. An armature 102 provided with an axial bushing 104 is mounted for axial and rotary movement on the shaft 98 adjacent each core piece 92.

When either coil 96 is energized, both armatures 102 experience a magnetic attraction; however, due to the greater magnetic flux in the core piece 92 enclosed by the energized coil, the adjacent armature 102 will experience the greater magnetic force.

An annular disc 106 is press fitted or otherwise secured to each armature 102 at one end thereof, the other end being adapted to slide on the shaft 98 in and out of the adjacent coil 96. Each disc 106 is provided with a pair of outwardly projecting lugs 108 adapted to engage complementary apertures in a drive plate 110 non-rotatably secured to the shaft 98. In this manner, each armature 102 is non-rotatably secured to the shaft 98, there being one drive plate at each end of the assembly. As described hereinbefore, the lugs 108 are of a length equal to or greater than the allowed axial motion of each armature 102 so as not to disengage the respective drive plates 110.

A second annular disc 112 is supported by springs 116 about each armature 102 between the disc 106 secured thereto and the corresponding cup-shaped structure 94. Each disc 112 is provided with a pair of lugs 114 adapted to engage springs 116, supported by ears 118 secured to the adjacent structure 94. The springs 116 cooperate to bias each of the discs 112 to a fixed angular position with respect to the adjacent structure 94.

As described hereinbefore, the discs 112 and adjacent flange portions 120, associated with the housing structures 94, are provided with pairs of opposing oppositely inclined arcuate recesses coacting with complementary ball bearing elements 122 so as to impart a rotary motion to the disc 112 as that disc is driven axially toward the adjacent flange portion 120.

As one or the other of the coils 96 is energized electrically, the adjacent armature 102 is driven inwardly of the energized coil bringing the disc 106 secured thereto into friction contact with the freely mounted disc 112. To insure a frictional bond, a clutch lining disc 124, made from any suitable fibrous material, is placed between the discs 106 and 112. As the disc 112 is driven toward the coacting flange 120, the disc 112 and, as a consequence, the disc 106 are rotated. Through the action of the lugs 108, the shaft 98 is rotated.

If the two rotary solenoids are constructed alike, as regards the operation of the rotary conversion mechanism, their opposite orientation about the common core element 90 will provide for clockwise or counterclockwise rotation of the shaft 98 according to which of the coils 96 is energized. Clearly, when neither coil is energized, the construction is such that the shaft 98 may be manually rotated.

The modification of FIGURE 7 is a common armature arrangement with two rotary solenoids in opposition. In this modification, two solenoids each including a core element 130 having a projecting core piece 132, a coil 134, a cup-shaped housing structure 136, and an end plate 138 adjacent the core element 130, are supported coaxially in opposing relation by a cylindrical tubular member 140 extending between the end plates 138 and enclosing the solenoids.

Disposed axially within each of the core elements 130 is a bushing 142, the axially aligned bushings 142 providing bearings for a shaft 144 extending axially through both solenoids. An armature 146 is mounted for sliding movement on the shaft 144 between the opposing solenoids, such that the armature 146 may be attracted magnetically inwardly of either coil 134, of either solenoid.

Figure 8:
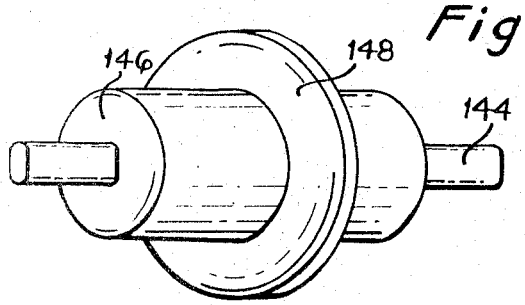
FIGURE 8 is a slightly enlarged view of a modified armature employed in the modification of FIGURE 7.

As shown in perspective in FIGURE 8, the armature is splined to the shaft 144 by providing opposite flat sided portions in the shaft 144 and a complementary slotted aperture in the armature 146. The armature 146 may slide upon the shaft 144, but cannot rotate independently of the shaft 144.

The armature 146 has an annular disc 148 press fitted or otherwise secured to the center thereof. Disposed on both sides of the disc 148 are clutch discs 150 made of a suitable fibrous material.

Adjacent each clutch disc 150 is a freely mounted disc 152 provided with arcuate inclined recesses adapted to coact with complementary inclined recesses disposed in a flange portion 154 of the adjacent cup-shaped structure 136, and a plurality of ball bearings 156 therebetween. Springs 158 interconnect the discs 152, the tension being such as to draw the discs 152 together, the springs being disposed angularly between the discs to create a rotating tension. The ball bearings 156 are permanently retained between the discs 152 and the coacting flange portions 154 by providing lugs 160 projecting from the inner wall of the tubular member 140 which serve to limit the axial motion of the discs 152 away from the flange portion 154.

When either one of the coils 134 is energized, the armature 146 will be drawn inwardly of the energized coil causing the disc 152 and flange portion 154 adjacent that coil to coact, imparting a rotary motion to the adjacent disc 152. Through the friction clutch between the disc 148 and the disc 152, the armature 146 and, as a result, the shaft 144 is rotated. By constructing the two rotary solenoids alike, as regards the operation of the rotary conversion mechanism, the opposing orientation will provide for actuation of the shaft 144 in either a clockwise or counterclockwise direction according to which of the coils 134 is energized.

It is evident that the modifications of FIGURES 6 and 7 illustrate but two of the many arrangements wherein two rotary solenoids of the type described herein may be combined to impart selectively a clockwise or counterclockwise rotation to a shaft, while retaining the desired characteristic that the shaft may be rotated independently of the solenoids.

Each of the foregoing embodiments employs a motion conversion mechanism including two opposed plates separated by three ball elements seated in arcuate inclined recesses. When these plates are actuated one toward the other, they are induced to rotate one relative to the other through the action of the ball elements in the inclined recesses. The induced relative rotation between these plates is put to effective use by anchoring one of the plates to the solenoid casing and connecting the other plate to the output shaft. Thus, in each of the foregoing embodiments, one plate is integral with the solenoid casing and a clutch connection is provided between the other plate and the output shaft.

Substantially, the same type of operation can be obtained by connecting one plate directly to the output shaft as through a splined connection and establishing a clutch connection between the other plate and the solenoid casing, this being a substantial reversal of parts. Such construction is illustrated in the embodiment of FIGURES 9 and 10.

This embodiment includes a substantially cup-shaped casing 180 having an end closure 196. A core element 182 is secured against the end closure by suitable mounting screws 183. Encircling the core 182 is a coil 184 protected with an insulating layer 186. A shaft 188 is journalled centrally within the core 182 by means of a sleeve bearing 190. The shaft 188 is secured against axial movement relative to the core 182 by means of a snap ring 192 seated in a groove 193 located in the shaft and trapped in a recess in the end closure 196. As thus far described, the structure of FIGURE 10 substantially duplicates that shown in FIGURE 2. With this construction, the shaft 188 is free to rotate relative to the solenoid casing 180 but is unable to move axially.

Within the core 182, the shaft 188 has a substantially circular cross section so as to receive optimum support from the sleeve bearing 190. To the left of the core 182, however, the shaft 188 has flattened sides so as to have a double D section as illustrated at 189. An armature 200 is splined for axial movement on this portion of the shaft by means of a suitable bushing 202. With this construction the armature 200 is permitted to move axially to and from the core 182 while any rotary movement of the armature 200 will be transmitted to the shaft 188.

Press fitted on the armature 200 is an annular plate 206 provided with three arcuate inclined recesses 208. Intermediate this plate and the casing 180 is a second plate 212 provided with three arcuate inclined recesses 214 complementing those in the plate 206. The plates 206 and 212 are separated by three ball elements 210 seated in their respective recesses, the construction being similar to that illustrated in FIGURE 4 with reference to the previously described recesses 60 and 62.

It is found convenient to form the recesses in the plates 206 and 212 with a stamping operation which produces a raised boss 209 on the rear side of the plate opposite the recess. In the plate 212, this raised boss has been ground off so as to provide a smooth planar surface on the rear side of this plate. Opposite this surface is a complementary planar surface formed in the casing 180 with an inwardly turned flange 216. The opposing surfaces on the plate 212 and the flange 216 cooperate to form a clutch connection.

The plates 206 and 212 are biased to a predetermined position of relative rotation with springs 222 engaging lugs 218 and 220 formed on the respective plates. These springs act to align the shallow ends of the recesses in the respective plates, thereby driving the plates to maximum separation. The permissible separation between the plates is limited by means of a snap ring 204 seated on the shaft 188 to the left of the armature as viewed in FIGURE 10. The location of the snap ring 204 is such that the two plates 206 and 212 may be driven to maximum separation by the springs 222 without applying an axial thrust against the casing flange 216. In consequence of this construction, it is possible to rotate the shaft 188 manually to any desired position when the solenoid coil 184 is deenergized. When the shaft is rotated in the clockwise direction, as viewed in FIGURE 9, the plate 206 rotates with the shaft, and the plate 212 is caused to follow the rotary movement of the plate 206 by virtue of the connecting springs 222. When the plate 206 is rotated in the counterclockwise direction, as viewed in FIGURE 9, the rotational torque is transmitted directly to the plate 212 through the medium of the ball elements 210 which are seated in the shallow ends of the recesses in the plates. Thus, both plates rotate when the shaft 188 is manually rotated.

When the solenoid coil 184 is energized, the armature 200 is drawn into the solenoid casing toward the core 182. The initial inward movement of the armature takes up any play in the rotary conversion mechanism, thereby pressing the plate 212 against the flange 216. Friction contact between these two elements prevents rotation of the plate 212 relative to the solenoid casing. As discussed in connection with the preferred embodiment, this friction contact may be enhanced by magnetic attraction if both plates are ferromagnetic. Further inward movement of the armature causes the ball elements 210 to move to the deep ends of the recesses formed in the opposing plates 206 and 212, thereby causing the plate 206 to rotate relative to the casing 180. This rotation is transmitted to the shaft 188 through the splined connection between the armature and the shaft. Thus, energization of the coil 184 produces a rotation of the shaft 188. This rotation causes the springs 222 to elongate. Upon deenergization of the coil 184 the pressure contact between the plate 212 and the flange 216 is relieved, permitting the springs 222 to contract and draw the plate 212 to its original alignment with the plate 206. This movement forces the armature 200 outwardly of the casing 180 away from the core 182, thereby resetting the solenoid for a second operation. In the event the movement of the shaft 188 is limited with a detent structure, as may be the case when the driven load comprises a series of wafer switches, the shaft 188 will be advanced through successive detent positions upon successive operations of the solenoid unit. Thus, if the detent structure were designed to give twelve equally spaced rotary positions for the shaft 188, the recesses in the plates 206 and 212 would be dimensioned to produce thirty degree increments of rotation of the shaft.

Each of the foregoing embodiments involves the adaptation of the rotary conversion mechanism of this invention to solenoid devices. FIGURES 11 and 12 illustrate a different type of modification wherein the rotary conversion mechanism is applied to a hydraulically or pneumatically actuated device. This device comprises a substantially cup-shaped casing 250 having an inlet aperture 252 located in the base thereof. Mounted for axial movement within the casing 250 is a piston 254. A gasket 256 surrounding the piston provides a fluid seal between the periphery of the piston and the interior wall of the casing such that the introduction of a fluid under pressure through the inlet 252 will cause the piston to move axially away from the inlet. The gasket 256 is supported by an annular shoulder 258 formed at the base of the piston 254.

The end of the casing 250 opposite the inlet is closed with a cover 274, secured to the casing with bolts 276. A sleeve bearing 272 fitted centrally in the cover 274 supports a shaft 264 projecting into the interior of the casing. Axial movement of this shaft is limited by snap rings 268 and 270 seated in suitable grooves on opposite sides of the bearing 272. The inward end of the shaft 264 is fluted as illustrated at 266 to provide a splined connection with a thrust plate 262 located under the piston 254. Axial movement of the piston 254 is transmitted to the thrust plate 262 through a suitable thrust bearing illustrated at 260.

Interposed between the thrust plate 262 and the cover 274 are two annular plates 278 and 282. The plate 278 is secured fixedly to the cover 274 and is provided with three arcuate inclined recesses 280. The plate 282 encircles the shaft 264 so as to be rotatable thereabout. This plate has three arcuate inclined recesses 284 formed therein, the recesses 280 and 284 having substantially the configuration of the recesses 60 and 62, illustrated in FIGURE 4. Ball elements 286 are interposed between the opposing pairs of recesses in the plates 278 and 282, there being a total of three ball elements disposed between the two plates.

The plates 278 and 282 are biased to a predetermined position of relative rotation with a coil spring 288 encircling the plate 282, this spring being fixed at one end to the periphery of the plate 282 and at the other end to the interior wall of the casing 250. The action of the spring 288 is such as to bias the plate 282 to a point where the shallow ends of the recesses in the plate 282 are aligned with the shallow ends of the recesses in the plate 278. This action causes the plates 278 and 282 to move to a point of maximum separation.

Interposed between the plate 282 and the thrust plate 262 is a clutch lining 290. The construction and arrangement is such that upon introduction of a fluid under pressure through the inlet 252, the piston 254 drives the thrust plate 262 against the clutch lining 290, thereby frictionally joining the thrust plate 262 with the plate 282. Further movement of the piston 254 produces a rotary movement of the plate 282 through the medium of the ball elements 286. This rotary movement is transmitted to the shaft 264 through the splined connection between the thrust plate 262 and the shaft. When the fluid pressure behind the piston 254 is relieved, the spring 288 acts to reset the plate 282 and, since the friction contact between the plates 262, 282 and the clutch lining 290 has been relieved, the plate 282 will be rotated independently of the thrust plate 262. As the plate 282 is reset, the piston 254 is forced upwardly in the casing 250 as viewed in FIGURE 12. Upward movement of the piston 254 is limited by suitable stops 292 formed on the piston. These stops limit the amount of play that can develop in the thrust bearing 260 and in the ball elements 286 associated with the rotary conversion mechanism.

From the foregoing, it is seen that the rotary conversion mechanism and associated clutch means of the present invention is adaptable to numerous types of actuator devices including solenoid actuator devices and fluid actuator devices. It is further apparent that the present invention enables the construction of actuator devices wherein the output shaft is manually rotatable whenever the actuator mechanism is deenergized and wherein the output shaft is driven positively whenever the actuator mechanism is energized. It is also evident in each of the embodiments disclosed that the clutch plates associated with the rotary conversion mechanism are engaged at substantially the same instant that rotary motion is induced in the conversion mechanism, the actuating pressure supplied to the assemblies having been transmitted to one through the other. Hence, all of the rotary movement produced is transmitted to the output shaft, there being no lost rotary motion.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a magnetically operated device, the combination including an electromagnet having a ferromagnetic core, a shaft journalled for rotation in said core and projecting outwardly therefrom, a casing encircling said electromagnet and secured fixedly thereto, said casing supporting an annular flange at one end thereof concentric with said shaft, an armature mounted for rotation and axial movement upon said shaft, a first apertured disc encircling said armature and having one side thereof in parallel opposing relation to said annular flange, said flange and said first disc being provided with a plurality of pairs of opposing inclined recesses, a plurality of anti-friction elements, there being one said element disposed between each pair of opposing inclined recesses, said recesses being so arranged that an axial movement of said first disc toward said flange will impart a rotary movement to said first disc, yielding means engaging said first disc and opposing the aforesaid rotary movement, a second apertured disc mounted upon said armature in parallel relation to said first disc, means coupling said second disc non-rotatably to said shaft, said last named means including means limiting the axial movement of said armature away from said flange upon said shaft, said first and second discs being adapted to engage in friction contact, said armature moving in response to energization of said electromagnet and having means engaging said second disc so as to carry both said discs axially toward said flange portion when the electromagnet is energized.

2. A magnetically operated device according to claim 1 wherein a fibrous element is provided between said first and second discs so as to insure friction contact between said discs upon energization of said electromagnet.

3. In a magnetically operated device, an electromagnet having a ferromagnetic core, a shaft mounted for rotation in axial alignment with said core, an armature mounted for axial and rotary movement on said shaft, said armature moving axially upon said shaft in response to energization of said electromagnet, a clutch means including a pair of opposing parallel discs, the first of which is carried by said armature, the second being mounted for independent rotary and axial movement adjacent said first disc, self-returning means including said second disc for converting the axial movement of said armature to combined axial and rotary movement of said second disc, said armature responding to energization of said electromagnet to move said parallel discs into friction contact whereby the rotary motion of said second disc is transferred to the first disc, and means transmitting the rotary motion of said first disc to said shaft.

4. In a magnetically operated device, an electromagnet, an armature mounted for linear movement adjacent said electromagnet so as to be driven linearly thereby, a clutch means including a pair of opposing parallel discs the first of which is carried by said armature, the second being mounted for independent rotary and linear movement adjacent said first disc, means including said second disc for converting the linear motion of said armature to combined axial and rotary movement of said second disc, yielding means opposing said rotary motion biasing said second disc to a predetermined rotary position, said armature responding to energization of said electromagnet to move said opposing discs into friction contact whereby the rotary motion of said second disc is transferred to the first disc.

5. A magnetically operated device comprising, in combination, an electromagnet including a core, a shaft journalled for rotation in said core and projecting axially therefrom, an armature mounted for rotary and axial motion upon said shaft, clutch means including a first disc carried by said armature and a second parallel and opposing disc mounted for rotation intermediate said first disc and the electromagnet, pressure actuated means for converting axial movement of said armature to combined axial and rotary movement of said second disc, said conversion means including an annular flange secured to said electromagnet in parallel opposing relation to said second disc, said opposing disc and flange being each provided with a plurality of inclined recesses arranged in opposing pairs, and a plurality of anti-friction elements disposed between said second disc and said annular flange whereby said second disc and said annular flange are maintained in spaced relation, there being one anti-friction element disposed between each pair of opposing recesses, said armature moving axially toward said electromagnet when the electromagnet is energized so as to draw said parallel discs into frictional contact and to press said second disc against said anti-friction elements thereby actuating said conversion means, said first and second discs rotating in response thereto, means engaging said shaft and said first disc transmitting said rotary motion to said shaft, and yielding means opposing the rotary motion of said second disc for restoring said second disc to a predetermined angular position relative to said annular flange when the electromagnet is deenergized.

6. A magnetically operated device according to claim 5 wherein the means transmitting the rotary motion to said shaft includes an elongate stud projecting from said first disc, and a drive plate fixedly secured to said shaft adjacent said armature, said drive plate having an aperture therein for receiving said stud whereby the first disc is free to move axially without disengaging the drive plate.

7. A magnetically operated device including an electromagnet, a driven shaft, an armature moved by said electromagnet, a ferromagnetic element engaged to said armature, rotary means engaged by said ferromagnetic element and rotating in one direction in response to movement of said armature upon energization of said electromagnet, means connecting said ferromagnetic element non-rotatably to said shaft, said ferromagnetic element responding to said electromagnet upon energization of said electromagnet to magnetically engage said rotary means whereby said rotary means rotates said ferromagnetic element and said shaft in said one direction, and resilient means to rotate said rotary means in a reverse direction to return said rotary means to a predetermined position when the electromagnet is deenergized.

8. A magnetically operated device according to claim 7, wherein said rotary means includes a first ferromagnetic disc and said ferromagnetic element comprises a second disc encircling said armature and disposed adjacent said first disc, said second disc being moved by said armature into engaging relationship with said first disc in response to energization of the electromagnet.

9. A magnetically operated device according to claim 7, wherein said rotary means includes a first ferromagnetic disc and said ferromagnetic element includes a second disc confronting said first disc, a clutch lining disposed between said discs, said discs being mounted concentrically with said shaft, said discs being moved by said armature into engaging relationship with said clutch lining in response to energization of the electromagnet.

10. An electromagnetically operated device including first and second electromagnets arranged in spaced opposing relation, a shaft rotatably supported thereby, an armature responsive to said electromagnets slidably and non-rotatably engaged to said shaft for reciprocation between said electromagnets, a friction element supported by said armature, first and second rotary means supported adjacent said first and second electromagnets respectively, each rotary means having a rotary member rotated in response to movement of said friction element thereagainst, friction between said friction element and the rotary member engaged thereby transmitting the rotation of such rotary member to said armature and said shaft, and yielding means opposing the rotation of each rotary member for restoring each rotary member to a predetermined position when the adjacent electromagnet is deenergized.

11. A rotary solenoid construction for providing a predetermined angular movement from a normal rest position in one direction or reverse direction, said construction comprising a pair of rotary solenoids, each solenoid having a magnetic field structure including a magnetizing winding, each solenoid including an armature, a driving member rigidly secured to each armature, means for each solenoid including a driven member for guiding the armature to move in a helical path, an intermediate portion of said structure securing said solenoids so that said armatures have their helical travel paths coaxial, one armature being adapted to turn in one direction and the other armature being adapted to turn in the opposite direction upon solenoid energization, means for mounting the driving and driven members so that when an armature moves because of the energization of its corresponding magnetic field structure said armature tends to force the driving member against the driven member, friction means for providing a clutch action between said driving member and its driven member, a shaft passing through both armatures, means for coupling said shaft to each driving member for rotation, said last named means permitting each driving member to move longitudinally with respect to the shaft, and means for biasing each driven member to a normal rest position.

12. A rotary solenoid construction for providing a predetermined angular movement in one direction or reverse direction from a normal rest position, said construction comprising a pair of rotary solenoids, each solenoid having a stationary ferromagnetic core having a straight passage therethrough and having outer surfaces circularly symmetrical with respect to the axis of said passage, an annular magnetizing winding for each core, a generally cup-shaped member around each winding, said cup-shaped members being ferromagnetic and having the bottom portion of the cup apertured, a cylindrical armature within each cup aperture, said armature being movable inwardly of the cup toward the core upon energization of the corresponding winding, an intermediate portion of said core for mounting said pair of solenoids so that the various parts are in aligned relation with the armature moving in opposite directions axially of the construction, a shaft passing through the two armatures and cores, said shaft being loose, a driving member for each armature, a driven member for each armature, said driving and driven members being outside of the cup-shaped members, each driven member being between the corresponding driving member and the outer surface of the bottom of the corresponding cup member, means cooperating with said opposed surfaces of the cup and driven member for guiding each driven member along a helical path coaxial with the shaft, each driven member being adapted to approach the cup as it turns in one direction and to move away from the cup in the reverse direction, said two driving members turning in opposite directions on approaching their respective cups, means for biasing each driven member to a normal position away from the cup, and means for coupling the shaft to each driving member, said coupling means rotatively locking said shaft to said two driving members but permitting relative longitudinal movement of said driving members and armatures with respect to said shaft whereby said shaft may be oscillated without substantial longitudinal movement, each armature when moving in response to solenoid energization urging said driving member against the driven member to create a driving connection between the two.

13. A magnetically operated device including an electromagnet and an armature moved linearly thereby, a driven shaft, rotary means including a first plate and means to rotate said first plate through a limited angle in response to pressure applied by said armature, a friction plate engaged non-rotatably with said driven shaft and positioned adjacent said first plate to form a clutch therewith, said armature engaging said friction plate and, upon energization of said electromagnet, said armature moving said friction plate against said rotary means whereby both said clutch and said rotary means are subjected to pressure from the armature at substantially the same time, said rotary means thereby cooperating with said friction plate to rotate said shaft through a limited angle when the electromagnet is energized, and yielding means opposing the rotary means for restoring the rotary means to a predetermined position when the electromagnet is deenergized.

14. In a magnetically operated device, an electromagnet, an armature responsive to said electromagnet and driven linearly thereby, a first member engaged by said electromagnet, a second member engaged by said armature, a third member interposed between said first and second members and movable axially and rotatably relative to each of said first and second members, said third member having a surface confronting one of said first and second members and frictionally engageable with said one member, means interposed between the other of said first and second members and said third member, said means cooperating with said other member and said third member to induce limited relative rotation between said other member and said third member upon movement of said other member and said third member one toward the other, said armature, upon energization of said electromagnet, moving said second member toward said first member so as to compress said third member between said first and second members and thereby frictionally engage said third member with said one of said first and second members and simultaneously cause said third member to approach said other of said first and second members so as to induce relative rotation between said other and said third members, said frictional engagement between said third member and said one member causing said relative rotation to occur between said first and second members.

15. A rotary actuator device comprising: rotary means including a pair of opposing plate members and means interposed between said plate members for inducing relative rotation of said members through a limited angle upon linear movement of said members one toward the other, a driven shaft and means supporting said shaft for rotation, first means providing a connection between said driven shaft and one of said plate members, second means providing a connection between said support means and the other of said plate members, one of said first and second means comprising a friction plate positioned adjacent one of said plate members to frictionally engage therewith, and actuator means to apply a pressure to said friction plate and said rotary means one through the other whereby said friction plate is engaged frictionally to said rotary means at substantially the same time said plate members of said rotary means are moved to induce relative rotation thereof, said first and second means transmitting the relative rotation to said shaft and said supporting means whereby the shaft rotates through a limited angle with respect to said supporting means, said friction plate disengaging said rotary means to enable free rotation of said shaft through an unlimited angle in the absence of pressure from said actuator means.

16. A rotary actuator device according to claim 15 wherein said actuator means comprises a hydraulic piston responsive to fluid pressure supplied thereto.

17. A rotary actuator device according to claim 15 wherein said actuator means comprises an armature and an electromagnet for imparting motion to said armature.

18. A rotary actuator device according to claim 15 including a friction lining interposed between said friction plate and adjacent plate member of said rotary means.

19. In a rotary electromagnetically operated actuator having an electromagnet and an armature mounted for linear movement relative to said electromagnet, the improvements comprising a member mounted for rotary movement relative to said armature, means operable to impart rotary movement to the member in response to linear movement of the armature, and an output shaft having connection to said member allowing axial movement of said member relative to said shaft, said connection providing for rotation of said output shaft without axial movement thereof.

20. In a rotary electromagnetically operated actuator comprising an electromagnet, an armature mounted for linear movement relative to the electromagnet, the improvements comprising a member mounted for rotary movement relative to said armature, said armature having means to apply a thrust to said rotary member, means to impart rotary movement to said member in response to linear axial movement of the said armature, and an output shaft connected relative to said rotary member so as to receive only torque and not axial thrust or movement therefrom.

21. The structure of claim 20 wherein the means operable to impart rotary movement to the member are fixed, and positioned to receive the axial thrust.

22. In a rotary electromagnetically operated actuator comprising an electromagnet, an armature mounted for linear movement relative to the electromagnet, a member mounted for rotary movement and axial movement, means for imparting rotary movement and axial movement to the member in response to linear movement of the armature, said means comprising an assembly of roller members, and means comprising an assembly having inclined surfaces engageable with the roller members to impart rotary and axial movement to the rotary member as a result of axial thrust as between the rollers and the inclined surfaces, only one of said assemblies being constructed to revolve about a central axis and driven shaft means mounted to have only rotational movement, said driven shaft means having connection to said rotary member.

23. The structure of claim 20 including a spiral torsion spring for restoring the said rotary member, said spring being connected at one end to said member and being operable to distort axially upon axial movement of the armature whereby to restore the rotary member and the armature upon release of the electromagnet.

References Cited by the Examiner

UNITED STATES PATENTS

| | | | |
|---|---|---|---|
| 1,470,961 | 10/1923 | Creveling. | |
| 2,618,368 | 11/1952 | Hoover | 192/84 X |
| 2,763,793 | 9/1956 | Krasney | 192—84 X |
| 2,859,845 | 11/1958 | Bachman | 192—84 X |
| 2,866,910 | 12/1958 | Bentley. | |
| 2,973,748 | 3/1961 | Leland et al. | 74—89 X |
| 2,978,916 | 4/1961 | Metcalf | 74—89 X |
| 3,075,395 | 1/1963 | Leland et al. | 74—89 |

BERNARD A. GILHEANY, *Primary Examiner.*

BROUGHTON G. DURHAM, *Examiner.*

JOHN BURNS, L. B. STERNFELS, G. HARRIS,
*Assistant Examiners.*